United States Patent [19]
Uhtenwoldt et al.

[11] 3,781,070
[45] Dec. 25, 1973

[54] MACHINE TOOL

[75] Inventors: Herbert R. Uhtenwoldt, Worcester; Richard E. Crossman, Leominster; Charles T. Caliri, Worcester, all of Mass.

[73] Assignee: Cincinnati Milacro-Heald Corp., Worcester, Mass.

[22] Filed: May 18, 1972

[21] Appl. No.: 254,500

[52] U.S. Cl. .............................................. 308/5 R
[51] Int. Cl. ........................................... F16c 17/16
[58] Field of Search ...................... 308/5 R, 9, 122; 137/118, 625.44

[56] References Cited
UNITED STATES PATENTS
3,582,159  6/1971  Uhtenwoldt .................. 308/5 R
3,512,848  5/1970  Uhtenwoldt .................. 308/5 R FOREIGN PATENTS OR APPLICATIONS
824,436  7/1949  Germany ...................... 137/118

Primary Examiner—Manuel A. Antonakas
Assistant Examiner—R. H. Lazarus
Attorney—Norman S. Blodgett

[57] ABSTRACT

A machine tool in which a moveable table is mounted in opposed hydrostatic bearings which have means for regulating the flow to the bearings to maintain a stable position of the table despite changes in load.

6 Claims, 5 Drawing Figures

PATENTED DEC 25 1973    3,781,070

MACHINE TOOL

BACKGROUND OF THE INVENTION

In the manufacture of machine tools, one of the outstanding problems is maintaining the vertical positioning of a table which is slideable in a horizontal plane relative to the base of the machine tool and which carries operative machining elements. One way to maintain the positioning of such a table despite changes in load on the table is to mount it in hydrostatic ways. These bearings are particularly appropriate when located in opposition on the upper and lower surfaces of a table, especially when an interconnecting means is used to balance the pressures in the bearings, so that they compensate for changes in load on the table. While capillary tubes in the passages have been used, as well as diaphram-type valves, the system that seems to work best is that of using a reed at a junction between the upper and lower bearings so that oil flowing to the bearings is divided between them in such a way as to maintain the table in a static position. Attempts to use this method of balancing the bearing flow have been somewhat less than successful because of certain difficulties in manufacture. For one thing, when the reed is made strong enough to resist the wear and tear of daily use, the position does not change sufficiently to react to small changes in force before the forces become larger than is acceptable. Furthermore, in order to manufacture the machine tool at a practical cost, it is difficult to locate the reeds accurately enought to be effective. These and other difficulties experienced with the prior art devices have been obviated in a noval manner by the present invention.

It is, therefore, an outstanding object of the invention to provide a machine tool having a sliding table which is very rigid.

Another object of this invention is the provision of a machine tool in which a sliding element is maintained in a selected location despite changes in force upon it.

A further object of the present invention is the provision of a machine tool having opposed hydrostatic bearings with a flow-selecting reed which is very sensitive to changes in force on the table.

It is another object of the instant invention to provide a machine tool having opposed hydrostatic bearings supporting a table element, wherein a slow-selecting reed is very accurately mounted in a flow-dividing circuit.

A still further object of the invention is the provision of a method of manufacturing a machine tool to provide very accurate location of a flow-dividing reed in a hydrostatic bearing circuit.

It is a further object of the invention to provide a machine tool having a hydrostatic bearing with a novel pocket configuration adapted to resist variations in load on the bearing.

SUMMARY OF THE INVENTION

In general the invention consists of a machine tool having a base with two facing, spaced, flat surfaces, between which is located a table having opposed, spaced, parallel, generally-flat surfaces. Each surface of the table lies adjacent a corresponding flat surface of the base to define a gap therebetween. A source of pressure fluid is associated with the table and it includes a main passage extending through the table and auxiliary passages leading from the main passage to each gap. A bushing lies in the main passage and a pintle is mounted in the bushing with a free end directed toward the main passage to divide the flow of pressure fluid between the passages. The bushing is accurately mounted in the main passage by the use of an epoxy bed lying between the surface of the main passage and the outer surface of the bushing.

More specifically, the pintle is cantilever mounted and has its free end in the general shape of a cylinder which is concentric with the main passage. The free end of the pintle is formed with a generally hemispherical concavity to provide a knife edge at the intersection between the concavity and the cylindrical surface. Each bearing consists of a pocket having a peripheral land and a centrally-located pad to provide for damping.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
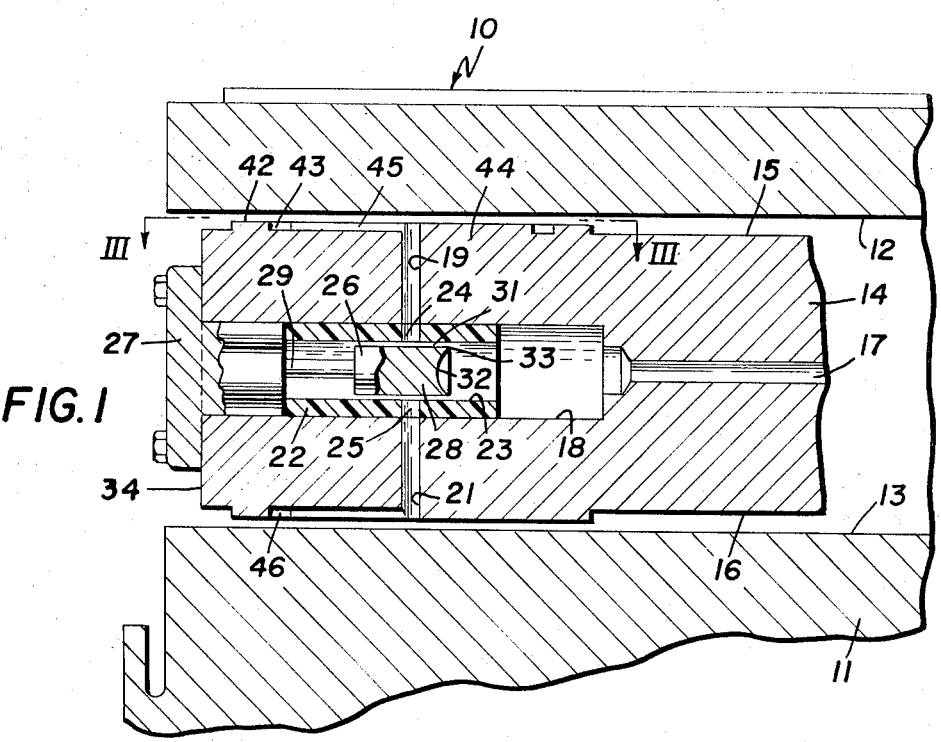
FIG. 1 is a vertical sectional view of a machine tool embodying the principles of the present invention.

Referring first to FIG. 1, wherein are best shown the general features of the invention, the machine tool, indicated generally by the reference numeral 10, is shown as having a base 11 with two facing, spaced, parallel, flat surfaces 12 and 13 and having a table 14 located between the surfaces. The table has two opposed, spaced, parallel, generally-flat surfaces 15 and 16. The surface 15 lies adjacent the corresponding surface 12 of the base 11 to define a gap therebetween, while the surface 16 lies adjacent the lower flat surface 13 of the base to also define a gap.

A source of pressure fluid is associated with the table 14 and includes a main entrance passage 17 extending through the table midway between the surfaces 15 and 16. The passage enters the inner end of a bore 18. From the intermediate portion of the bore 18 are diametrically opposed and whose outer ends terminate respectively in the gaps associated with the surfaces 15 and 16.

Located in the bore 18 is a bronze bushing 22 having a very accurately formed inner bore 23. Passages 24 and 25 extend through the wall of the bushing in alignment with the secondary passages 19 and 21.

Lying in the bushing 22 is a pintle 26. One end of the pintle is provided with a base 27, which is bolted to one end of the table surrounding the bore 18 and at the other end is provided with a cantilever-supported head 28. The immediate portion of the pintle is a cylindrical rod 29 whose diameter is substantially less than that of the bore 23 in the busing. The pintle serves the purpose of dividing the flow of pressure fluid from the main passage 17 into two parts, one of which enters the passages 25 and 21. For that purpose the head 28 is provided with a cylindrical surface 31 which is concentric with the bore 23 in the bushing and with a hemispherical concave surface 32 at the end of the head facing toward the entrance of the main passage 17 into the bore 18. The cylindrical surface 31 intersects the spherical surface 32 to provide a circular knife edge 33 directed into the fluid flow to give a very accurate division of the flow.

One of the important features of the present invention is that the bore 23 in the bushing 22 lies exactly at a right angle to the end surface 34 of the table 14. When this geometric arrangement is brought about and the pintle 26 is accurately formed, the head 28 of the pintle will lie exactly concentric with the bore 23 and, therefore, an exactly equal distance from the passages 24 and 25 in the bushing.

Figure 2:
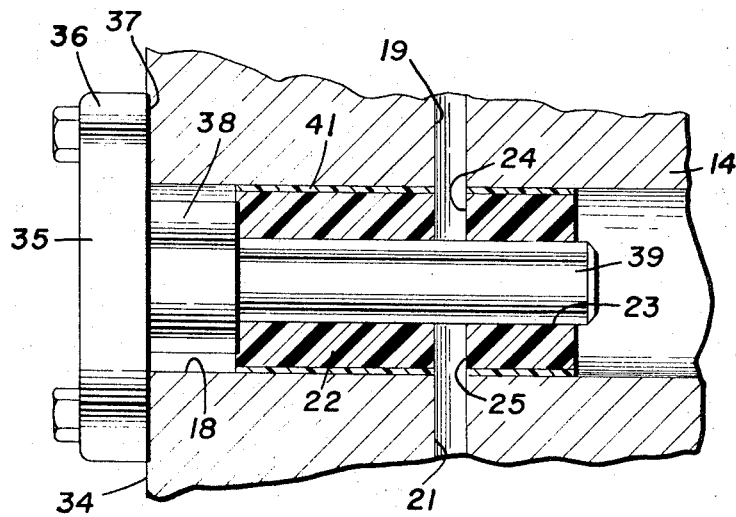
FIG. 2 is a vertical sectional view of the same machine showing the conditions during manufacture.

The manner in which the bushing 22 is accurately located relative to the end surface 34 of the table is illustrated in FIG. 2. For this purpose a special accurately-formed jig or gage 35 is provided. It has a head 36 with an accurately-formed flat undersurface 37 adapted to engage the end surface 34 of the table and to be bolted in place using the same bolt holes as will be used eventually for the pintle 26.

Extending from the center of the head 36 to the bore 18 is a cylindrical hub 38. From the center of the hub extends a cylindrical rod 39. The cylindrical surface of the rod 39 is accurately formed to fit tightly in the bore 23 in the bushing 22, and, furthermore, its axis is very accurately located at a right angle to the surface 37 of the gage. The outer surface of the bushing 22 is coated with a layer of an unhardened epoxy plastic, preferably of the type known as Loctite, thus forming a layer 41.

The bushing is inserted along with the gage into the bore 18 in the table and the passages 24 and 25 are visually aligned with the passages 19 and 21. Wax rods are inserted in the passages to prevent epoxy from enterng the holes. Then, the head 36 of the gage is bolted to the table and the epoxy is allowed to set. Once the bushing 22 has been located in this way, the gage is removed and the pintle 26 takes its place to result in the construction shown in FIG. 1.

Figure 3:
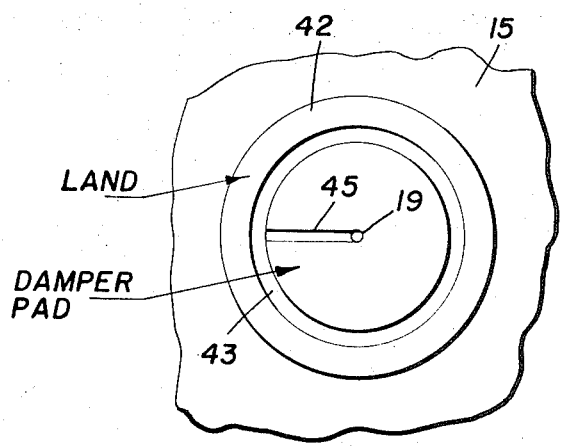
FIG. 3 is a horizontal sectional view of the machine tool taken on the line III—III of FIG. 1.

As is shown in FIG. 3, the hydrostatic pad consists of a circular land 42 which extends upwardly a short distance above the main surface 15 of the table. The land, therefore, defines a circular pocket 43 in the center of which is located a damper pad 44. The oil arrives in the pocket through the centrally-located passage 19 and is carried by a radial groove 45 into the pocket 43. A similar hydrostatic pocket 46 is located on the underside of the table 14 and is serviced by the passage 21.

Figure 4:
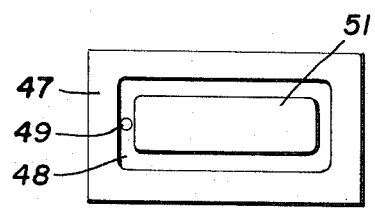
FIG. 4 is a horizontal sectional view of a modification of the invention.

FIG. 4 shows a variation on the form of the hydrostatic pocket. A generally rectangular land 47 defines a similarly-shaped pocket 48 into which the hydrostatic oil is introduced through a passage 49. A rectangular damper pad 51 is located in the center of the pocket.

Figure 5:
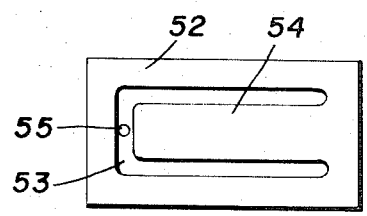
FIG. 5 is a horizontal sectional view of another embodiment of the invention.

FIG. 5 shows another version of the hydrostatic pocket. A rectangular land 52 surrounds a pocket 53 into which the hydrostatic fluid is introduced through a passage 54. A rectangular damper pad 54 extends from one side of the land 52 into the pocket 53 thus giving the pocket 53 a U-shaped configuration.

The operation of the apparatus will now be readily understood in view of the above description. The effect of the use of the pintel 26 is to keep the bearing float height nearly constant over a large load range. The pintle can be termed "active" and it regulates flow to the bearing by sensing pocket pressure. Pocket pressure increases as load increases. The pressure feedback through the passages causes the pintle beam or rod 29 to bend away from the oil feed hole and allows greater flow to the loaded pocket. With the pintle accurately located between the passages 24 and 25, by use of the method shown in FIG. 2, the regulation of the pocket pressures can be very accurately and automatically determined. In operation the fluid under pressure enters the table through the passage 17 and into the bore 18. It flows then into the bore 23 and the bushing 22 and is divided by the knife edge 33 of the pintle 26 into flow passing to the passages 24 and 19 on the one hand, and to the passages 25 and 21 on the other hand. The oil passes into the hydrostatic pockets 43 and 46 in the usual way to maintain the table 14 at a given spacing between the surfaces 12 and 13 of the base 11. The load in the table 14 is increased. The back pressure from the pocket 46 will increase and cause the rod 29 to bend and move the head 28 of the pintle further away from the passage 25 to allow greater flow to that particular pocket. This will tend to restore the table to its original position, or as a practical matter, to maintain the table 14 in its position at all times irrespective of changes of load. Since squeeze film damping is a good way to add dynamic stiffness to a bearing system, the pad 44 in the pocket 43 and a corresponding pad in the pocket 46 provides a thin film of oil which acts as a vertical motion damper and in effect gives a stiffer bearing. Damping action is most readily achieved by keeping the center area or pad of the pocket at the same height as the land. As a practical matter, it should be slightly lower than the land to eliminate contact with the surfaces 12 and 13 altogether.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A machine tool, comprising
   a. a base having two facing, spaced, parallel, flat surfaces,
   b. a table located between the surfaces and having opposed, spaced, parallel, generally-flat surfaces, each surface of the table lying adjacent a corresponding flat surface of the base to define a gap therebetween,
   c. a source of pressure fluid associated with the table and including a main passage extending through the table and an auxiliary passage leading from the main passage to each gap,
   d. a bushing lying in the main passage, and
   e. a pintle mounted in the bushing and having a free end lying in the main passage to divide the flow of pressure fluid between the passages, the bushing being accurately mounted in the main passage by the use of a plastic bed lying between the surface of the passage and the outer surface of the bushing.

2. A machine tool as recited in claim 1, wherein the plastic is epoxy.

3. A machine tool as recited in claim 1, wherein the free end of the pintle has a head with a cylindrical surface only slightly smaller than the bore in the bushing, the end of the head being formed with a hemispherical concave surface which intersects the cylindrical surface to form a circular knife edge.

4. A machine tool as recited in claim 3, wherein the head of the pintle is connected by a rod of relatively small diameter to a base which is bolted to the table.

5. A machine tool as recited in claim 4, wherein the table is provided with an accurately-formed flat end surface into which the main passage enters and the base of the pintle has a corresponding flat surface which is accurately formed to lie at a right angle to the axis of the cylindrical surface of the head for engagement with the said end surface of the table.

6. A machine tool as recited in claim 1, wherein each of the said flat surfaces of the table is provided with a hydrostatic pocket defined by a land and having a centrally-located damping pad.

\* \* \* \* \*